(No Model.)
J. NELLIS.
VINE TRELLIS.
No. 257,370. Patented May 2, 1882.
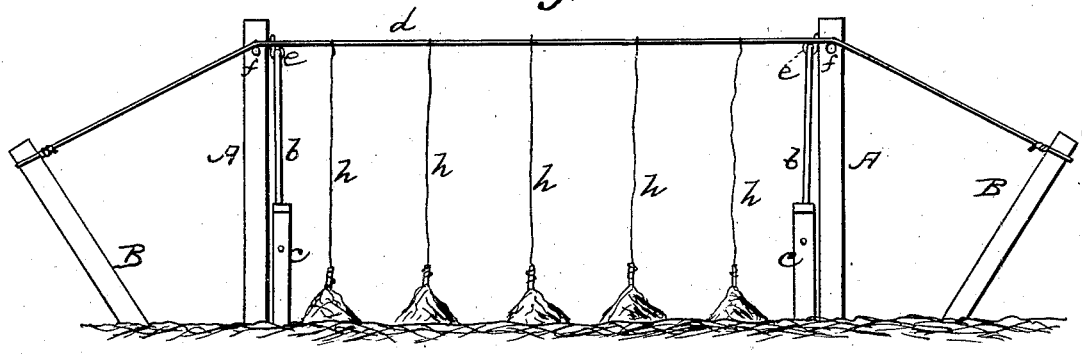
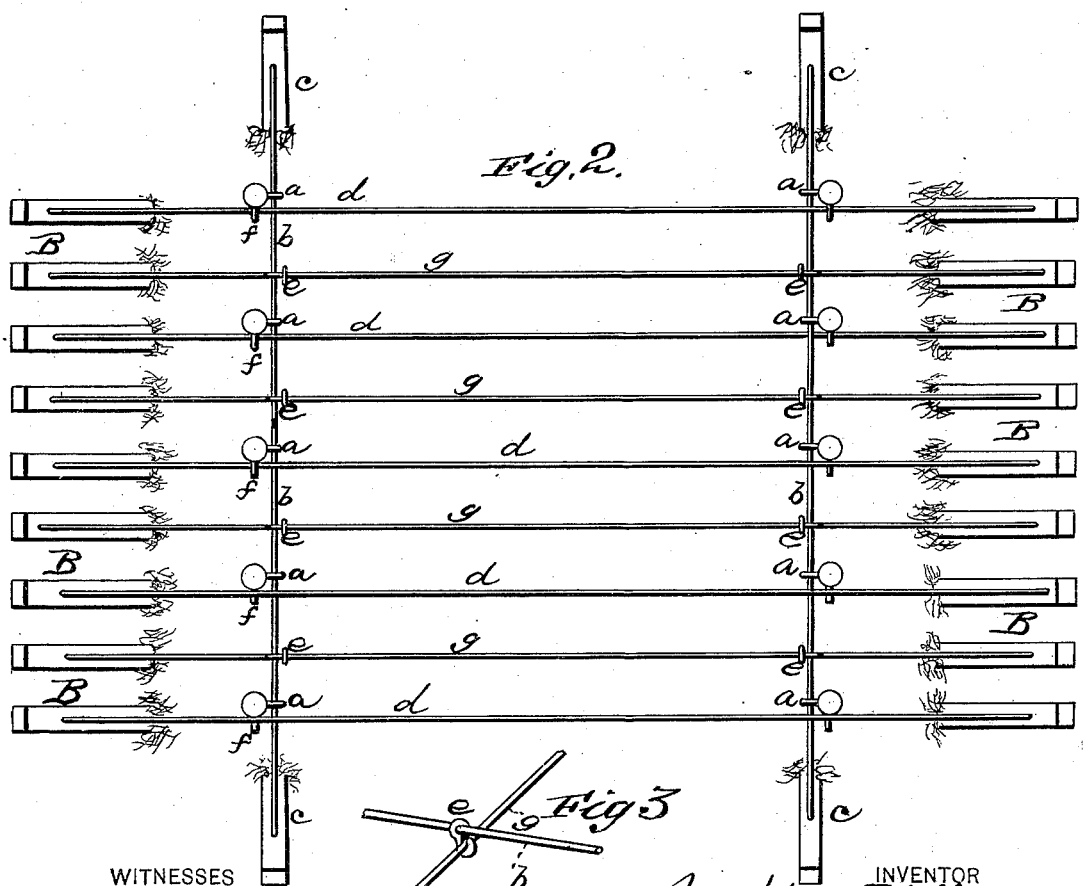
WITNESSES
Philip E. Masi
James J. Shuhy
INVENTOR
Josephus Nellis
By Wm. H. Bates & Co.
his ATTORNEYS

UNITED STATES PATENT OFFICE.

JOSEPHUS NELLIS, OF PALATINE BRIDGE, NEW YORK.

VINE-TRELLIS.

SPECIFICATION forming part of Letters Patent No. 257,370, dated May 2, 1882.

Application filed March 29, 1882. (No model.)

*To all whom it may concern:*

Be it known that I, JOSEPHUS NELLIS, a citizen of the United States, residing at Palatine Bridge, in the county of Montgomery and State of New York, have invented certain new and useful Improvements in Trellises for Vines, of which the following is a specification, reference being had therein to the accompanying drawings.

This invention has relation to improvements in that class of devices known as "trellises," whereby vines are supported and trained; and it consists in the novel arrangement of the posts, the wires which are supported thereby, the stakes to which the ends of these wires are secured, and the hooks that connect the wires that run opposite to one another, all of which will be hereinafter more fully explained.

The annexed drawings, to which reference is made, fully illustrate my invention, in which Figure 1 represents an end view of my improved trellis, and Fig. 2 represents a top or plan view of the same. Fig. 3 represents a view of one of the hooks detached from the trellis.

The letter A designates the posts, which are formed in rows and of equal distance apart. The same are provided, near the upper ends thereof, with staples $a$, that receive a wire, $b$, the ends of which are twisted around or otherwise secured to stakes $c$, which are driven in the ground at each end of the rows of posts A.

B designates rows of stakes driven in the ground parallel to the posts aforesaid, and have secured thereto the ends of the wires $d$, which extend from stake to stake and cross the wires $b$, as shown in the drawings. The wires $d$ are connected at the point where they cross the wires $b$ to the latter by means of hooks $e$, that are easily applied thereto. The wires $d$ are supported at the upper end of the posts by pins or staples $f$, while it will be observed that the wires $g$, running parallel to the wires $d$, are not supported by posts, but by the hooks hereinbefore mentioned.

It will be seen by the foregoing description that each alternate wire $g$ is supported by the hooks, thus dispensing with a post for that purpose.

Secured to the wires $d$ $g$, and depending therefrom, are cords or wires $h$, on which the vines cling and are supported. Also, it will be noticed that in constructing my trellis, the wires being crossed as shown securely fastens each post or pole, thereby making them secure from falling should they become decayed at the lower end. Said wires $b$ also sustain each alternate wire, thereby, as above mentioned, dispensing with posts that would otherwise be needed for that purpose.

A trellis constructed as herein described, and shown in the drawings, is simple in construction, easily erected, and at the same time durable.

Having described this invention, what I claim, and desire to secure by Letters Patent, is—

1. In a trellis, the arrangement of the wires $b$, $d$, and $g$, the former secured to the posts A and attached at each end to the stakes $c$, and the latter running crosswise the same and connected thereto by the hooks $e$, and secured at the ends to the stakes B, as shown and described.

2. In a trellis, the hooks $e$, attached to the wires $b$, in combination with the wires $d$, posts A, and stakes B $c$, as described, and for the purpose specified.

In testimony whereof I affix my signature in presence of two witnesses.

JOSEPHUS NELLIS.

Witnesses:
 N. S. BRUMLY,
 ALONZO GEWEYE.